July 26, 1949.　　　　　E. H. LAND　　　　　2,477,304
SELF-DEVELOPING CAMERA

Filed June 25, 1948　　　　　　　　　　　　　3 Sheets-Sheet 1

INVENTOR
Edwin H. Land
BY Donald L. Brown
and Oliver H. Hayes
Attorneys

July 26, 1949.　　　　　E. H. LAND　　　　　2,477,304
SELF-DEVELOPING CAMERA

Filed June 25, 1948　　　　　　　　　　　3 Sheets-Sheet 2

INVENTOR
Edwin H. Land
BY Donald L. Brown
and
Oliver W. Hayes
Attorneys

July 26, 1949.　　　　　E. H. LAND　　　　　2,477,304
SELF-DEVELOPING CAMERA

Filed June 25, 1948　　　　　　　　　　　　3 Sheets-Sheet 3

INVENTOR
Edwin H. Land
BY
Donald L. Brown
and
Oliver H. Hayes
Attorneys

Patented July 26, 1949

2,477,304

UNITED STATES PATENT OFFICE 2,477,304

SELF-DEVELOPING CAMERA

Edwin H. Land, Cambridge, Mass., assignor to Polaroid Corporation, Cambridge, Mass., a corporation of Delaware Application June 25, 1948, Serial No. 35,142

15 Claims. (Cl. 95—13)

This invention relates to photography and more particularly to novel photographic apparatus such as a camera. This application is in part a continuation of my copending application Serial No. 657,366 filed March 27, 1946 and is in part a continuation of my copending application Serial No. 712,887 filed November 29, 1946.

A principal object of the present invention is to provide a novel camera apparatus for use with a film unit comprising a photo-sensitive layer carried by a first sheet, a second sheet superposed with an area of said photosensitive layer adapted to be exposed to light, and a container positioned between said sheets adjacent an edge of the area, the camera being adapted to so handle said two sheets as to permit exposure of the photosensitive area and the processing thereof by releasing a processing liquid from said container and spreading it between the exposed photosensitive area and the corresponding area on the second sheet.

Another object of the invention is to provide a camera apparatus particularly adaptable for use with film units which can be individually loaded into the camera, or a plurality of film units which can be loaded in a magazine for insertion in the camera, each film unit comprising two opaque strata lying on opposite sides of a photosensitive area carried by the film unit, said apparatus permitting exposure of the photosensitive area while the film unit is positioned in the camera and being capable of spreading a processing liquid across the exposed photosensitive area as the film unit is discharged from the camera, with the two light-opaque strata superposed on opposite sides of the exposed area.

Still another object of the invention is to provide a camera of the above type wherein individual hinged film units, comprising two separable layers and a container, may have a photosensitive area thereof exposed to actinic light within the camera, the film unit being ejected after processing of the exposed film unit and wherein improved means are provided for handling such film units.

Still another object of the invention is to provide an attachment which can be readily applied to the back of existing cameras to enable said cameras to expose and process a silver halide photosensitive layer to obtain therefrom, if desired, a positive image of a subject image to which said photosensitive layer is exposed.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In general this invention relates to a camera apparatus particularly adapted for use with novel composite film units of the type described in my copending applications mentioned above. A preferred form of film unit for use with the invention comprises a photosensitive element including a photosensitive silver halide layer carried by a sheet, a second sheet, superposed with an area of the photosensitive layer, adapted to be exposed to light and a container positioned between the two sheets adjacent an edge of this area. These two sheets which lie on opposite sides of the photosensitive layer may be opaque so as to prevent actinic light from reaching the photosensitive material when the two sheets are superposed. One of the sheets is displaceable from superposition with the other sheet so as to permit exposure of this photosensitive area when the film unit is positioned in the camera. This invention relates primarily to the apparatus for handling such a film unit so as to obtain the exposure of the photosensitive area thereof and subsequent processing of the exposed area.

A preferred form of the apparatus comprises means for holding the film unit with the photosensitive sheet and the second sheet superposed.

The camera includes a discharge opening through which the two sheets of the film unit may be discharged in superposition after exposure and processing by the camera. To enable exposure of the photosensitive area of the film unit, there are provided means for engaging a portion of one of the two sheets of the film unit and for moving said engaged sheet out of superposition with the other sheet while this other sheet remains stationary. There is also provided a means for exposing the photosensitive area to actinic light when the sheets are out of superposition. For processing the exposed film unit, there is provided a processing means preferably comprising a pair of pressure-applying surfaces mounted adjacent the above-mentioned discharge opening, these pressure-applying surfaces being adapted to compress the film unit during advancement thereof between said surfaces so as to release said processing liquid carried by the container and to spread said liquid between facing surfaces of said exposed photosensitive sheet and said second sheet.

Figure 1:
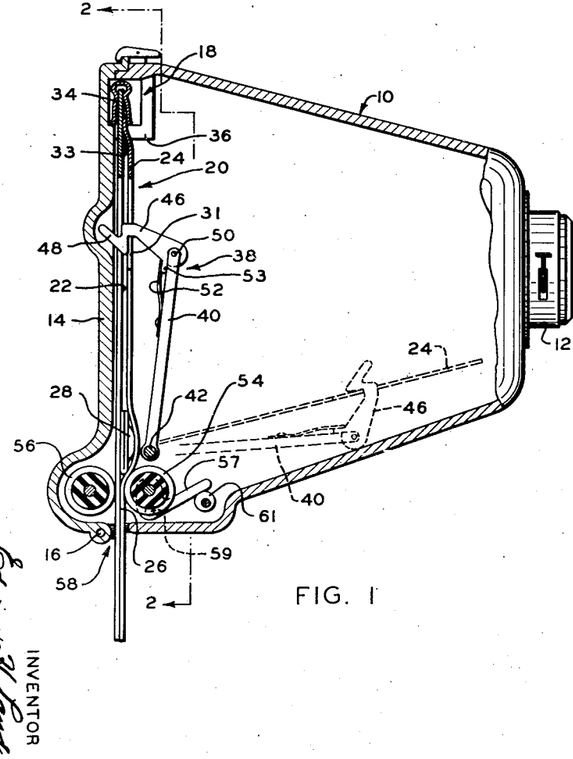
Figure 1 is a fragmentary exaggerated schematic sectional view of one preferred form of the invention as embodied in a hand-held camera.
Figure 2:
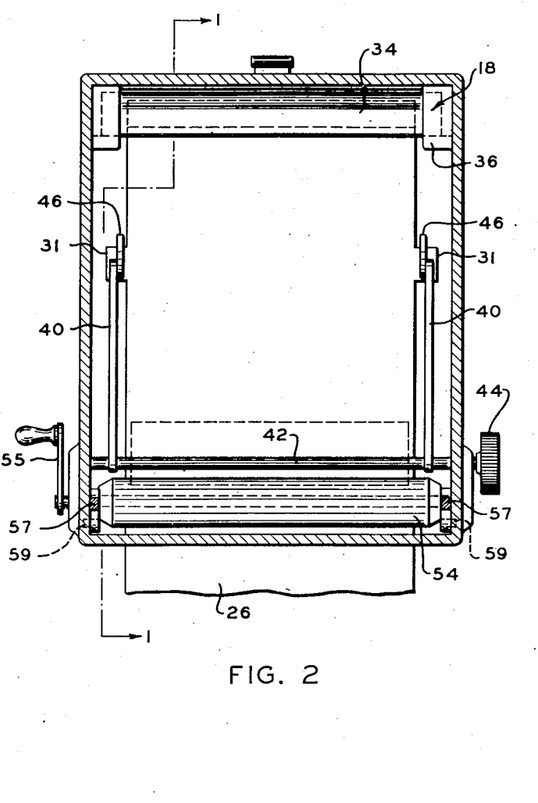
Fig. 2 is a sectional view of Fig. 1 taken along the line 2—2.

In one preferred form of the invention the means for engaging and moving one of the sheets comprises a means for swinging the engaged sheet from superposition with the other sheet to a position where exposure of the photosensitive area, carried by one of the sheets, can be accomplished. In one form of the invention, as illustrated in Figs. 1 and 2, the apparatus comprises means for holding the film unit so that the photosensitive area is held in the focal plane and the engaging means is arranged to engage a portion of the film unit and to swing the other sheet from superposition with the photosensitive sheet to a position where it does not interfere with the exposure of the photosensitive area in the focal plane. In another form of the invention the film unit is held in the camera in a position other than in the focal plane and the engaging means engages a portion of the film unit and swings the photosensitive sheet into the focal plane.

Referring now to Figs. 1 and 2 there is shown one preferred modification of the invention which comprises a hand-held camera having a body generally indicated at 10, this camera body supporting a suitable lens and shutter schematically indicated at 12. A rear door portion 14 of the housing 10 is removably associated therewith, such as by being pivotally secured to the housing, as at 16. Associated with the housing adjacent the rear door 14 is a holding means 18 adapted to hold a film unit schematically indicated at 20. Holding means 18 is arranged to cooperate with rear door 14 to hold a photosensitive sheet 22, carried by the film unit, flat in the focal plane of the camera. Equally, rear door 14 may be provided with a spring-pressed backing plate for urging the photosensitive sheet against a focal-plane-defining frame carried by housing 10.

Figure 3:
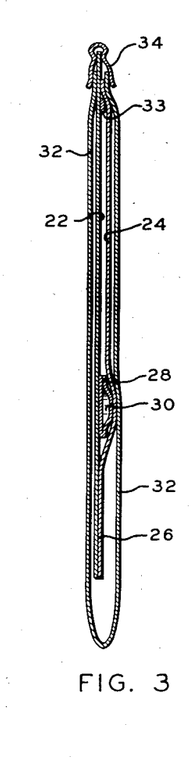
Fig. 3 is a fragmentary exaggerated schematic sectional view of one preferred type of film unit for use in the camera of Figs. 1 and 2.

Film 20 includes, in addition to the photosensitive sheet 22, which is preferably a silver halide emulsion layer on an opaque base, a second sheet 24 which is also preferably opaque and relatively stiff. Positioned between the two sheets, adjacent a leader connection 26 for the two sheets, is a container 28 preferably secured to sheet 22 and releasably holding a supply of a processing liquid 30 (Fig. 3). The container 28 is arranged to release its contained liquid for spreading between the two sheets 22 and 24. A liquid trap 33 is positioned on the photosensitive sheet 22 at the end opposite the container. Sheet 24 includes a portion thereof adapted to be engaged by a means in the camera for swinging the sheet 24 away from the photosensitive sheet 22 to permit exposure of the latter. In the form shown, this portion comprises a pair of tabs 31. For maintaining the film unit light-tight during handling and loading, there is provided an opaque envelope 32, (shown in Fig. 3), which is held on the film unit by means of a clip 34. Clip 34 is quite securely fastened to the photosensitive sheet 22 but allows easy removal of envelope 32 and sheet 24 therefrom. A row of perforations (not shown) in sheet 22 just below the clip allows this sheet to break away from the clip when sufficient pull is applied.

Holding means 18 comprises a pair of lugs 36 adapted to maintain clip 34 securely in position in the camera, the clip in turn holding the photosensitive sheet flat in the focal plane during exposure thereof. The means for engaging the second sheet, and swinging the second sheet 24 out of superposition with the photosensitive sheet 22, is schematically indicated at 38 and comprises, in one form, a pair of arms 40 pivotally mounted in the housing by means such as a bar 42, the arm seen in Fig. 1 being the near arm. A knob 44, on the outside of the camera, is provided for rotating bar 42 to cause a swinging of arms 40. Mounted on each arm 40 is a hook shown at 46, the hook 46 having a downwardly tapered outer end portion 48 and being pivotally connected to arm 40 by means such as a pin 50. For normally holding the hook in the position shown, there is included a spring 52 which engages a lug 53 carried by hook 46 and thus urges the hook 46 in a counter-clockwise direction around pivot pin 50.

For processing the exposed photosensitive sheet, there is provided means defining a pair of pressure-applying surfaces, this means preferably comprising a pair of pressure rolls schematically indicated at 54 and 56. Roll 54 is preferably mounted on housing 10 and roll 56 is preferably mounted on rear door 14 so that the rolls are separated as the result of opening rear door 14 incidental to loading a film unit into the camera. Roll 54 is preferably carried at each end by one arm of a bell crank 57, which is shown as having a pivot point at 59. The other arm of each bell crank rides on a cam 61 which can be rotated by an external knob (not shown). A handle 55 (see Fig. 2) may be associated with roll 56 to drive the pressure rolls, the use of the handle being advantageous in some cases. As can be seen, the lower portion of door 14 and housing 10 define a light-tight discharge opening 58 through which the film unit may be discharged from the camera during processing thereof.

In the use of the invention described above, a film unit of the type shown in Fig. 3 is loaded into the camera by opening rear door 14 and placing the leader end of the film unit between separated rolls 54, 56. The clip 34 is placed between lugs 36 and the rear door is moved to the closed position shown. That portion of envelope 32 extending from opening 58 is then grasped and pulled out of the camera, the clip 34 holding the remainder of the film unit in position. The leader part of the film unit may then be pulled slightly to assure that the photosensitive sheet is flat in the focal plane and cam 61 is rotated to move roller 54 towards roll 56 and apply pressure between the rolls. Then the knob 44 is operated to move arms 40 into the position shown in Fig. 1, the tapered ends 48 of hooks 46 forcing hooks 46 over and behind the tabs 31 on sheet 24. Rotation of arms 40 in a clockwise direction, to the position shown in the dotted lines in Fig. 1, causes the sheet 24 to be pulled from under clip 34 and to travel down to the position shown in the dotted lines. Exposure of a predetermined area of the photosensitive sheet is now accomplished by suitably operating the shutter 12. After this, that portion of the film unit extending from the opening 58 is pulled hard, thus releasing the photosensitive sheet from the clip 34 and advancing the film unit between the rolls 54, 56. Equally, handle 55 may be used for rotating rolls 54, 56 to cause the advancement of the film unit between the rolls. This advancement of the film unit releases the liquid 30 from the container 28 and spreads the liquid between the two sheets 22—24, temporarily bonding these sheets together in an opaque sandwich to permit a predetermined processing of the exposed photosensitive area by the spread liquid in the absence of actinic light. After a predetermined time, about 1 minute, during which time the above processing takes place, the two sheets may be separated. Before the next film unit is loaded in the camera, the clip 34, held by lugs 36 is moved from the camera to make room for the clip associated with the next film unit.

In a preferred form of camera embodying the features shown in Figs. 1 and 2, the camera is made of metal, wood or suitable plastics, the rolls 54, 56 being preferably made of rubber when in the form shown. The rolls may be made of metal or plastics and can have a fixed spacing or be under a spring load. In the latter case, either the rolls have spacing collars associated therewith or the film unit contains spacing strips. Equally, nonrotating converging pressure-applying surfaces may be used in place of rolls. The film unit preferably comprises a usual silver halide emulsion which is coated on paper, or other suitable carrier, and which preferably has an opaque backing. The photosensitive layer need not be, and for economy may not be, coextensive in area with sheet 22. The second sheet can be formed of a number of materials. It can be a relatively stiff black cardboard, for example. In this case, the liquid may comprise an aqueous viscous alkaline solution of a developer and a silver halide solvent capable of developing, and preferably also of fixing, the latent negative image created in the silver halide layer by exposure thereof.

Equally, sheet 24 can be a white baryta paper, the spread liquid simultaneously developing negative and positive images on the two sheets. Additionally, a positive white precipitate image may be formed on a black image-carrying sheet as described in my copending application Serial No. 708,007 filed November 6, 1946. The camera 10 can be arranged so that sheet 24 is swung sufficiently far so that light passing through lens 12, and reflected from the surface of sheet 24, cannot reach the photosensitive layer. Equally, there can be used a protective nonreflecting screen of the type shown and claimed in the copending application of Murry N. Fairbank, filed on even date herewith.

In a preferred form of apparatus and product, the pressure rolls 54, 56 may be driven by means of handle 55, this feature of the invention being advantageous when the sheets 22—24 are not completely light-opaque and it is desired to discharge the processed film unit into a dark chamber which can be provided adjacent opening 58.

This form of the invention is also of advantage in those cases wherein it is desirable to discharge the processed film unit into the envelope 32. One type of film unit so usable comprises the film unit of Fig. 3 which has a connection, such as a pair of strings for example, between the envelope 32 and the clip 34 which permits only a predetermined withdrawal of the envelope from the film unit. This string may, for example, be long enough to extend from the clip 34 to just below pressure rolls 54, 56. Thus the envelope, when removed, is held partially within the opening 58 and its mouth is just below the rolls 54, 56, the leader portion of the film unit remaining in the envelope. When the rolls are rotated to process the film unit, the film unit, as it is processed, advances into the envelope 32 where the completion of the processing can take place free from actinic light. With this modification of the film unit, the strings connecting the clip 34 to envelope 32 preferably run from the ends of clip 34 in Fig. 2 to the edges of the envelope, thereby passing the relieved end portions of the rolls 54, 56 so that rotation of the rolls does not pull the strings.

While one preferred engaging means has been shown in Figs. 1 and 2 it is subject to considerable modification within the scope of the invention. It may, for example, comprise a pressure-sensitive adhesive strip secured to the end of arm 40 in place of hook 46. It may be a suction cup or a thumb tack, for example, mounted on arm 40. Equally, the portion of film unit 20 to be engaged may be considerably modified from the form shown. It may comprise a metal strip, a loop of wire or string, or a protruding rivet etc., in which case the engaging means, carried by arm 40, is suitably modified to meet the requirements of the particular case.

Additionally, the movement of arm 40 may be accomplished other than by turning the knob 44. For example, this arm may be controlled by a spring, the spring being released by operation of the shutter mechanism. With such a modification of the invention, this spring can be conveniently wound up by rotation of the pressure rolls 54, 56, the first part of the rotation thereof moving arm 40 upwardly and the remainder of the rotation winding up the spring for subsequent movement of the arm 40. Equally, the spring can be separately wound or can be wound as a result of opening or closing rear door 14.

Figure 4:
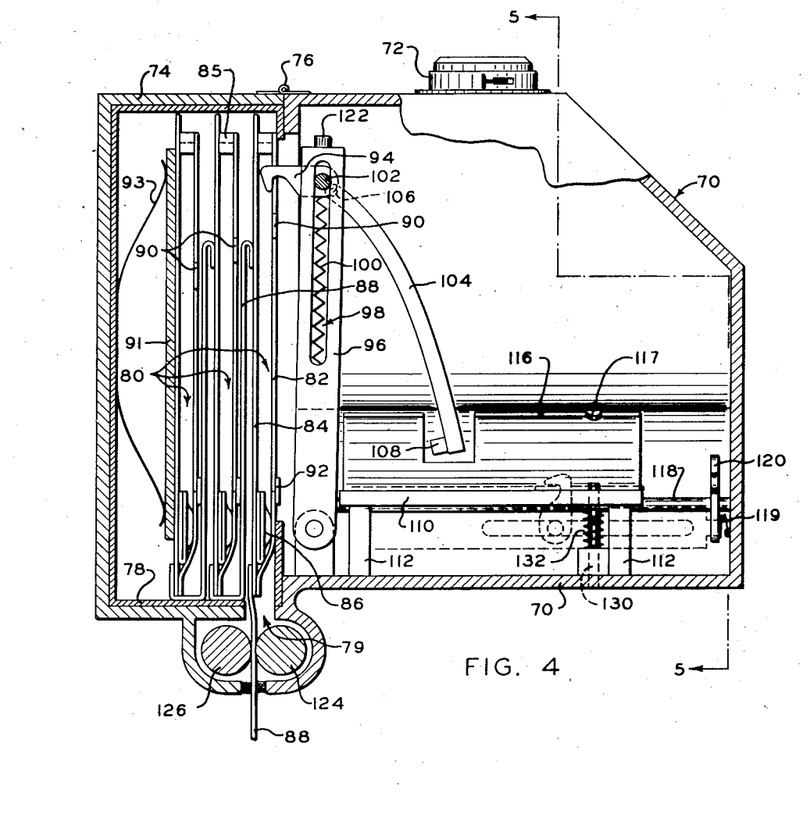
Fig. 4 is a fragmentary exaggerated schematic sectional view of still another modification of the invention particularly useful with a magazine containing a plurality of film units.
Figure 5:
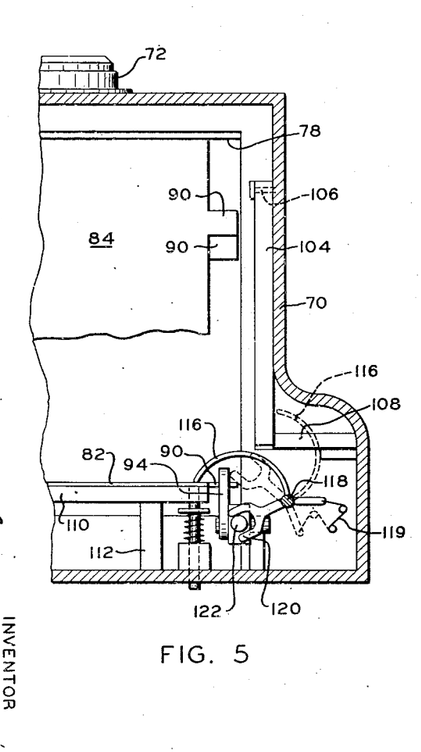
Fig. 5 is a sectional view of Fig. 4 taken along the line 5—5 with certain of the parts of the camera in a different position.

Referring now to Figs. 4 and 5, there is shown another modification of the invention particularly useful with a magazine containing a plurality of film units of the type shown in Figs. 1 through 3, these film units being preferably sequentially connected by leader stock so as to permit sequential exposure and processing thereof. In these figures, 70 represents a camera body having a lens and shutter assembly 72. At 74, there is shown a magazine holder, pivotally mounted on the housing 70 at 76, into which a magazine 78 may be inserted. The housing 70 and magazine holder 74 define an opening 79 therebetween through which a film unit, indicated at 80, may be withdrawn. Each film unit 80 comprises a photosensitive sheet 82, an image-carrying sheet 84, a liquid trap 85, a container 86 and a leader 88 for connecting one film unit with succeeding film units. A pair of tabs 90 are provided on the photosensitive sheet 82 and this sheet is hinged to the rest of the film unit as at 92. As can be seen, tabs 90 on the succeeding film units are staggered, each pair of tabs 90 being spaced slightly below the pair of tabs associated with the preceding film unit. A usual backing plate 91 and spring 93 are preferably included in the magazine for urging the film units 80 forwardly to the front of the magazine 78.

For handling such film units, the camera is preferably somewhat modified from that shown in Figs. 1 and 2. In the form of the invention shown in Figs. 4 and 5, the means for engaging one of the sheets follows two different paths during its two directions of movement and preferably comprises a pair of hooks 94 carried by a pair of arms 96, each arm having a slot 98 therein. Each hook 94 is free to travel up and down in slot 98, its downward motion being accomplished by a weak spring 100 and its upward motion being accomplished by a cam follower 102. Each cam follower 102 is controlled by a cam 104 pivoted around a pin 106. The arm shown in Fig. 4 is the near arm while the cam 104 is the far cam, the near cam being omitted for clarity of illustration. The cam 104 is free to rotate to the right around pivot 106, as seen in Fig. 4, but is unable to rotate to the left due to a stop 108. A spring (not shown) normally biases the cam 104 to the left into the position shown in Fig. 4. For holding the photosensitive sheet 82 in the focal plane of the camera, there is provided a backing plate 110 supported by means such as rods 112. For grasping the edges of the photosensitive sheet 82, while it is supported on backing plate 110, there is included a holding clamp indicated at 116 as being mounted on a pivotal rod 118. An arm 120, on the end of rod 118, is adapted to be engaged by a stud 122 carried by the end of arm 96. A spring 119 biases the clamp 116 in either the solid line or the dotted line position thereof (see Fig. 5).

For processing the exposed photosensitive sheet, there is provided a processing means comprising, in a preferred form, a pair of pressure rolls indicated at 124 and 126. These rolls serve the same function as the rolls 54, 56 in the previous modification of the invention and are made in a similar manner. Roll 124 is preferably mounted on the housing 70 and roll 126 is preferably carried by the magazine holder 74 so as to be movable, with the magazine holder, when said holder is separated from the rest of the housing during insertion of the magazine. Since no envelope is employed the bell crank mounting of Figs. 1 and 2 may be omitted.

In the use of the camera shown in Figs. 4 and 5, the magazine holder 74 is swung to the left around pivot 76, carrying roll 126 therewith. The magazine 78 is inserted in the holder 74 and the leader 88, for the first film unit, is placed over roll 126. The magazine is then swung to closed position and that portion of the leader extending from the camera is pulled to remove a cover sheet from the magazine, a portion of the leader remaining in the position shown. The camera is now loaded and ready for use.

In the operation of the camera, assume that the arm 96 is in the position shown in Fig. 4, with the cam follower 102 just about to reach the end of the cam 104. When the arm 96 is rotated slightly to the left of the position shown, hook 94 is moved above and in position to engage the tab 90 associated with the first photosensitive sheet 82 in the magazine. This movement of arm 96 to the left causes cam follower 102 to pass off the end of cam 104, and allows the spring 100 to pull hook 94 down into engagement with the topmost tab in the magazine, i. e., the tab associated with the foremost film unit. When the hook 94 has engaged tab 90, the arm 96 is swung to the right, cam follower 102 moving the cam 104 to the side and passing beyond the end thereof. This movement of arm 96 brings the photosensitive sheet 82 down onto the backing plate 110 where it lies in the focal plane of the camera. During the latter part of the travel of arm 96, the stud 122 carried thereby engages and rotates arm 120 associated with the clamp-operating rod 118. The rotation of arm 120 from the dotted line position in Fig. 5 to the full line position in Fig. 5 causes the clamp 116 to move from the dotted line position to the full line position, thereby clamping the edge of the photosensitive sheet and holding this sheet flat in the focal plane. After exposure of the photosensitive sheet, the clamp 116 is released, such as by moving the arm 96 upwardly sufficiently to move arm 120 to the dotted line position of Fig. 5. The film unit is then processed by pulling on the leader 88 to cause the passage of the film unit between the pressure rolls so as to release the liquid from container 86 and to spread this liquid between the two sheets of the film unit.

When the arm 96 moves back to engage the next pair of tags on the succeeding photosensitive sheet, the cam follower 102 engages the right-hand side of the swinging cam 104 and travels up this right-hand side and along the top thereof until it assumes the position shown in Fig. 4. This movement of the cam follower during the return stroke of arm 96 raises the hook 94 so that it will be in position to drop down and engage the highest tab remaining in the film pack and thus be able to move the next succeeding photosensitive sheet into the focal plane of the camera.

The camera of Figs. 4 and 5 also preferably includes means for indicating the presence of the photosensitive sheet on the backing plate 110 so that, in case of faulty operation of the hooks or swinwing arm, this fact will be indicated to the camera user. This indicating means comprises, in one preferred form, a rod 130 which extends through camera housing 70, this rod being slightly longer than the distance from the top of plate 110 to the bottom of the outside of housing 70. Rod 130 is normally biased upwardly by a weak spring 132 so that the lower end of the rod 130 does not normally protrude from the camera housing. When the photosensitive sheet is moved into the focal plane, it engages the upper end of rod 130 and pushes the rod downwardly. As can be seen best in Fig. 5, rod 130 is positioned to engage the edge of the photosensitive sheet immediately adjacent a portion thereof held by the clamp 116. If arm 96 should be swung to the position shown in Fig. 5 without having engaged a photosensitive sheet 82, the rod 130 would not be depressed, due to the provision of a notch 117 in clamp 116, and the camera user would know that a photosensitive sheet was not in a position to be exposed.

Figure 6:
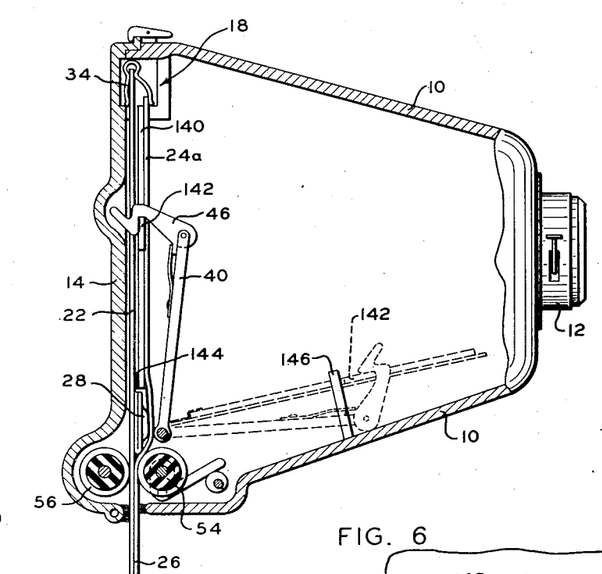
Fig. 6 is a fragmentary exaggerated schematic sectional view of a modification of the camera of Fig. 1.

In still another modification of the invention, the film unit contains, between the photosensitive sheet and the image-carrying sheet, a nonreflecting sheet which is adapted to absorb light passing through the lens system and which might otherwise fog the negative during exposure thereof. This nonreflecting sheet, in one preferred form of the invention, is that portion of the film unit which is engaged by the engaging means in the camera for swinging one of the layers from superposition with the other layer. In this latter modification of the invention, this nonreflecting sheet may be relatively stiff so that it is able to move, for example, a relatively flexible image-carrying sheet when the stiff nonreflecting sheet is engaged and moved during the use of the camera. In another modification of the invention, the nonreflecting sheet may be relatively flimsy and be carried for example, by the image-carrying sheet when the latter is engaged and swung out of superposition with the photosensitive sheet. In either case, the camera preferably includes means for engaging the nonreflecting sheet and holding this nonreflecting sheet in the camera when the other two sheets of the film unit are withdrawn subsequent to exposure of the photosensitive sheet for the purpose of processing the film unit. This latter holding means may be associated with, and be a part of the engaging means, or it may be a part of the previously mentioned holding means or it may be another means separate therefrom. This latter modification of the invention is shown in Fig. 6 wherein like numbers refer to like elements of Figs. 1, 2 and 3. In the modification of the invention of Fig. 6, the nonreflecting sheet is shown as preferably comprising a relatively stiff sheet having tabs adapted to be engaged by the engaging means in the camera so as to permit this engaging means to swing the nonreflecting sheet from superposition with the photosensitive sheet, thereby also swinging the image-carrying sheet from superposition with the photosensitive sheet. In Fig. 6, the photosensitive sheet is indicated at 22, the image-carrying sheet is indicated at 24a and the nonreflecting sheet is indicated at 140.

A pair of tabs 142 are provided on the nonreflecting sheet 140, these tabs being adapted to be engaged by hook 46 carried by swinging arm 40. The nonreflecting sheet 140 is preferably fastened to the image-carrying sheet 24a by an easily separated bond. A preferred fastening comprises a pair of lugs 144 secured to the image-carrying sheet and lightly engaging the bottom of nonreflecting sheet 140. These lugs 144 are preferably positioned at the edges of the film unit so as not to interfere with the spreading of the liquid from the container 28. The lugs can be made of metal, stiff paper, plastic and any other suitable materials. Numerous other fasteners may be employed, such for example, as a lug secured to the top of the nonreflecting sheet 140 and extending over the top of the image-carrying sheet 24a. Equally, a weak adhesive bond may be provided which is sufficient to prevent sheet 140 from sliding with respect to the image-carrying sheet 24a during the opening of the film unit and which will permit easy separation of the sheets during processing.

For the purpose of holding nonreflecting sheet 140 in the camera after exposure of the photosensitive sheet 22, there is provided another holding means shown, in one preferred form, as comprising a pair of pins 146 secured to the camera housing 10 adjacent that point to which the hook 46 carries the tabs 142 during the opening of the film unit.

In the use of the modification of the invention of Fig. 6, the rear door 14 of the camera is swung open, the leader portion 26 of the film unit is threaded through rolls 54, 56, clip 34 is placed in the holder 18 and the door 14 is closed. Then the envelope (not shown in Fig. 6) is removed, the rolls are moved to their pressure-applying position, and arm 40 is swung up to the position shown in Fig. 6 where hook 46 engages tab 142 on the nonreflecting sheet 140. The rotation of arm 40 to the right moves hook 46, sheet 140 and image-carrying sheet 24a to the dotted line position, the fastening lugs 144 preventing sliding of sheet 140 with respect to the image-carrying sheet 24a during this movement. When sheet 140 is moved to the dotted line position, it can be seen that the tabs 142 are behind the holding pins 146. Exposure of the photosensitive sheet 22 is now made, and the leader portion 26 of the film unit is pulled, thus advancing the container 28 and the two sheets 22 and 24a between the rolls, thereby releasing and spreading the liquid between these two sheets to accomplish the above-mentioned processing of the film unit. During this processing movement of the film unit, the nonreflecting sheet 140 is held by pins 146 which prevent movement of the tabs 142. The fastening lugs 144 are easily separated from the bottom edge of sheet 140 and thereby permit the image-carrying sheet 24a to be advanced through the rolls while the nonreflecting sheet 140 remains in the camera. Before the next film unit is inserted in the camera, the nonreflecting sheet 140 and the clip 34 are removed.

Figure 7:
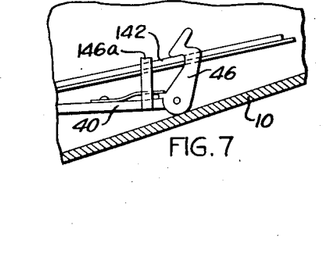
Fig. 7 is a fragmentary exaggerated schematic sectional view of a modification of the camera of Fig. 6.

While one preferred form of the invention of Fig. 6 has been shown, numerous other modifications thereof are feasible within the scope of the present invention. For example, the holding means for holding the nonreflecting sheet in the camera may be a part of the engaging means which engages and moves the nonreflecting sheet and image-carrying sheet. This modification of the invention is shown in Fig. 7, where like numbers refer to like elements in the other figures. In Fig. 7, a holding pin 146a is shown as being mounted on arm 40 so that it moves with the hook 46 up to engaging position. In this latter modification of the invention, no fastener is needed between the nonreflecting sheet 140 and the image-carrying sheet 24a since the pin 146a will support sheet 140 during the whole movement.

This latter modification of the invention may also be used to advantage in film units of the type described in my above-mentioned copending application Serial No. 712,887 wherein a string or other shear means is provided for shearing that edge of the container nearest the exposed area. In such a case, the container 28 may be secured to the photosenitive sheet 22 and a shear string or lip associated therewith may be secured to sheet 140, the movement of the lower edge of sheet 140 away from the container causing the opening thereof.

The above-discussed modifications of the invention described in connection with Fig. 6 are particularly advantageous since they permit the use of a relatively thin and flexible image-carrying sheet which, in certain cases, is desirable for the purpose of controlling the thickness with which the liquid is spread between the two sheets during the processing thereof.

While preferred forms of the invention have been described in the discussion of Figs. 1 through 7 above, a number of modifications may be made without departing from the scope of the invention. For example, in the cameras of Figs. 1, 2 and 6, the lens 12 can be positioned at the top of the camera instead of at the side of the camera as shown. With such a modification of the invention, the photosensitive sheet will be the foremost sheet in the film unit and this sheet will be moved from superposition with the image-carrying sheet down into the focal plane of the camera. With such a modification of the invention, it may be desirable, in some cases, to have a clamping means and a backing plate of the type shown in Figs. 4 and 5 so as to clamp the photosensitive layer securely in the focal plane. With this last-described modification of the invention, the nonreflecting sheet may be a relatively thin sheet securely fastened to the clip 34. This nonreflecting sheet may overlie the face of the image-carrying sheet, being held by the clip 34 when the photosensitive sheet has been moved to the focal plane and preventing reflection of light from the surface of the image-carrying sheet. In this form of the invention, the film unit, after exposure, may be advanced from the camera, the nonreflecting sheet being held in the camera by the clip 34 and being removed therewith after the processing of the exposed film unit has been completed. Equally, the camera shown in Figs. 4 and 5 may be modified by positioning the lens at the right-hand side of the camera instead of at the top of the camera as shown. In this case the image-carrying sheet would be the foremost sheet in each film unit and would be moved from superposition with the photosensitive sheet and the backing plate 91 and spring 93 would urge the photosensitive sheet into exposure position.

While several preferred photographic processes have been mentioned above, the invention is not limited thereto. The photosensitive material may comprise photosensitive compounds other than silver halides, for example diazonium compounds or ferric salts. Equally, the invention may be embodied in the form of an attachment to be added to existing cameras in place of the usual film pack or magazine holders supplied with such cameras. Although the invention has been shown in the preferred form as a hand-held camera, it is equally adaptable for use with large cameras, for example, large copying cameras or coin-controlled cameras wherein the sequence of operation of various elements of the camera may be controlled automatically, as by the insertion of a coin. Thus, the invention is equally useful for automatic portrait studios.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Camera apparatus for use with a composite film unit, said unit comprising a photosensitive sheet including a photosensitive layer, a second sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said photosensitive sheet and said second sheet, means providing a discharge opening through which said two sheets of a unit may be discharged in superposition from said camera, means within said camera for engaging a portion of one of said sheets and moving said engaged sheet out of superposition with said other sheet while said other sheet remains stationary, means for exposing said photosensitive area when said sheets are out of superposition, and means comprising a pair of pressure-applying surfaces mounted adjacent said discharge opening, said engaging means being arranged to be moved into engagement with said sheet to be engaged while said sheet is held by said holding means, said pressure-applying surfaces being positioned between said engaging means and said opening, said pressure-applying surfaces being adapted to compress said film unit during advancement of said unit between said pressure-applying surfaces, subjection of said composite unit to compression providing release of said processing liquid from said container and spreading of said liquid between outer surfaces of said exposed photosensitive sheet and said second sheet.

2. Camera apparatus for use with a composite film unit, said unit comprising a photosensitive sheet including a photosensitive layer, a second sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm including means positioned within said camera for engaging a portion of one of said sheets and swinging said sheet out of superposition with said other sheet while said other sheet is held stationary, means comprising a member positioned exteriorly of said camera for swinging said arm, means for exposing said photsensitive area when said sheets are out of superposition, and means comprising a pair of pressure-applying surfaces mounted adjacent said discharge opening, said engaging means being arranged to be moved into engagement with said sheet to be engaged while said sheet is held by said holding means, said pressure-applying surfaces being adapted to compress said film unit during advancement of said unit between said pressure-applying surfaces, subjection of said composite unit to compression providing release of said processing liquid from said container and spreading of said liquid between outer surfaces of said exposed photosensitive sheet and said second sheet.

3. Camera apparatus for use with a composite film unit, said unit comprising a photosensitive sheet including a photosensitive layer, an image-carrying sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed and with said photosensitive sheet in the focal plane of the camera, means providing a discharge opening through which said two sheets of a unit may be discharged in superposition from said camera, an arm positioned within said camera and slidably carrying a means for engaging a portion of said image-carrying sheet and swinging said image-carrying sheet out of superposition with said photosensitive area while said photosensitive sheet remains stationary in said focal plane, means for swinging said arm around a pivot point, means for urging said engaging means along said arm towards said pivot point, means for exposing said photosensitive area when said sheets are out of superposition, and means comprising a pair of pressure-applying surfaces mounted adjacent said discharge opening, said pressure-applying surfaces being adapted to compress said film unit during advancement of said unit between said pressure-applying surfaces, progressive subjection of said composite unit to compression providing release of said processing liquid from said container and spreading of said liquid between outer surfaces of said exposed photosensitive sheet and said image-carrying sheet.

4. Camera apparatus for use with a composite film unit, said unit comprising a photosensitive sheet including a photosensitive layer, an image-carrying sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said photosensitive sheet and said image-carrying sheet, means providing a discharge opening through which said two sheets of a unit may be discharged in superposition from said camera, an arm positioned within said camera including means for engaging a portion of said photosensitive sheet and swinging said photosensitive sheet out of superposition with said image-carrying sheet and into the focal plane of the camera, means comprising a member positioned exteriorly of said camera for swinging said arm, means rendered operable by movement of said arm for clamping edges of said photosensitive sheet and holding said photosensitive sheet flat in said focal plane, means for exposing said photosensitive area when said photosensitive sheet is in said focal plane, and means comprising a pair of pressure-applying surfaces mounted adjacent said discharge opening, said pressure-applying surfaces being adapted to compress said film unit during advancement of said unit between said pressure-applying surfaces, progressive subjection of said composite unit to compression providing release of said processing liquid from said container and spreading of said liquid between outer surfaces of said exposed photosensitive sheet and said image-carrying sheet.

5. Camera apparatus for use with a composite film unit, said unit comprising a photosensitive sheet including a photosensitive layer carried by an opaque base, a second sheet superposed with an area of said photosensitive layer adapted to be exposed to light, a container carrying a processing liquid and positioned between said sheets adjacent an edge of said area, one of said sheets being displaceable from super-position with the other sheet to permit exposure of said photosensitive area, said apparatus comprising, in combination, means for holding one of said sheets stationary, means providing a discharge opening through which said two sheets of a unit may be discharged in superposition from said camera, means positioned within said camera for engaging and moving a portion of said film unit so as to move said photosensitive sheet out of superposition with said held sheet, means for exposing said photosensitive area when said sheets are out of superposition, means comprising a pair of pressure rolls mounted adjacent said holding means, said holding means being arranged to release said held sheet for movement, in superposition with the other sheet, within said unit between the outer surfaces of said pressure rolls, and means extending to the exterior of said camera apparatus for moving said engaging means so as to move said photosensitive sheet out of superposition with said held sheet, said pressure rolls being positioned between said engaging means and said opening, said pressure rolls being adapted to compress said film unit during advancement of said unit therebetween, progressive subjection of said composite unit to compression providing release of said processing liquid from said container and spreading of said liquid between outer surfaces of said exposed photosensitive sheet and said second sheet.

6. Camera apparatus for use with a composite film unit, said unit comprising a photosensitive sheet including a photosensitive silver halide layer, an image-carrying sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, a nonreflecting sheet overlying a portion of that surface of said image-carrying sheet nearest said photosensitive sheet, said apparatus comprising, in combination, means for holding one of said first two sheets stationary, means for engaging and moving a portion of said film unit so as to move the other of said first two sheets out of superposition with said held sheet, means for exposing said photosensitive area when said sheets are out of superposition, means comprising a pair of pressure rolls mounted adjacent said holding means, said holding means being arranged to release said held sheet for movement, in superposition with the other of said first two sheets, between said pressure rolls, and means for maintaining said nonreflecting sheet in superposed relation with said image-carrying sheet so that said nonreflecting sheet lies between said exposing means and said image-carrying sheet during exposure of said photo-sensitive area, said last-named means maintaining said nonreflecting sheet in said camera upon movement of said film unit between said rolls, said pressure rolls being adapted to compress said film unit during advancement of said unit between said pressure rolls, subjection of said composite unit to compression providing release of said processing liquid from said container and spreading of said liquid between facing surfaces of said exposed photosensitive sheet and said image-carrying sheet.

7. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm, an engaging means carried by said arm, means for swinging said arm into position adjacent said film unit holding means to permit said engaging means to engage a portion of said film unit, said swinging means being capable of swinging said engaging means and said engaged portion of said film unit to a position permitting exposure of said photosensitive area of said film unit, means for exposing said photosensitive area when said sheets are out of superposition, and means comprising a pair of pressure-applying surfaces mounted adjacent said discharge opening, said surfaces being adapted to compress said film unit during advancement of said unit between said surfaces, subjection of said composite unit to compression providing release of said processing liquid from said container and spreading of said liquid between facing surfaces of said exposed photosensitive sheet and said second sheet.

8. Camera apparatus for use with a composite film unit, said unit comprising a photosensitive sheet including a photosensitive layer, an image-carrying sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said photosensitive sheet and said image-carrying sheet, means providing a discharge opening through which said two sheets of a unit may be discharged in superposition from said camera, means for engaging a portion of said photosensitive sheet and swinging said photosensitive sheet out of superposition with said image-carrying sheet and into the focal plane of the camera, means for exposing said photosensitive area when said photosensitive sheet is in said focal plane, means comprising a pair of clamping members for clamping portions of said photosensitive sheet to hold said photosensitive sheet flat in said focal plane, means associated with said moving means for moving one of said clamping members toward the other of said clamping members upon movement of said photosensitive sheet into said focal plane, and means comprising a pair of pressure-applying surfaces mounted adjacent said discharge opening, said pressure-applying surfaces being adapted to compress said film unit during advancement of said unit between said pressure-applying surfaces, progressive subjection of said composite unit to compression providing release of said processing liquid from said container and spreading of said liquid between outer surfaces of said exposed photosensitive sheet and said image-carrying sheet.

9. Camera apparatus for use with a composite film unit, said unit comprising a photosensitive sheet including a photosensitive silver halide layer, an image-carrying sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, a nonreflecting sheet overlying a portion of that surface of said image-carrying sheet nearest said photosensitive sheet, said apparatus comprising, in combination, means for holding said photosensitive sheet stationary, means for engaging a portion of said nonreflecting sheet and moving said nonreflecting sheet to cause a swinging movement of said image-carrying sheet from superposition with said photosensitive sheet, means for exposing said photosensitive area when said sheets are out of superposition, means comprising a pair of pressure rolls mounted adjacent said holding means, said holding means being arranged to release said photosensitive sheet for movement, in superposition with said image-carrying sheet, between said pressure rolls, said moving means positioning said nonreflecting sheet in superposed relation with said image-carrying sheet so that said nonreflecting sheet lies between said exposing means and said image-carrying sheet during exposure of said photosensitive area, and means maintaining said nonreflecting sheet in said camera upon movement of said film unit between said rolls, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said image-carrying sheet.

10. Camera apparatus for use with a plurality of composite film units in a magazine, each said unit comprising a photosensitive sheet including a photosensitive layer carried by an opaque base, an image-carrying sheet superposed with an area of said photosensitive layer adapted to be exposed to light, a container carrying a processing liquid and positioned within said unit between the outer surfaces of said sheets adjacent an edge of said area, one of said sheets being displaceable from superposition with the other sheet to permit exposure of said photosensitive area, said apparatus comprising, in combination, means for holding said magazine in said camera, means providing a discharge opening through which said two sheets of a unit may be discharged in superposition from said camera, an arm including means for engaging a portion of the foremost of said photosensitive sheets in said magazine and swinging said photosensitive sheet out of superposition with said image-carrying sheet and into the focal plane of the camera, means for swinging said arm, means movable into engagement with said photosensitive sheet for clamping said photosensitive sheet in said focal plane, means associated with said arm for moving said clamping means, means for exposing said photosensitive area when said photosensitive sheet is in said focal plane, and means comprising a pair of pressure-applying surfaces mounted adjacent said discharge opening, said pressure-applying surfaces being adapted to compress said film unit during advancement of said unit between said pressure-applying surfaces, progressive subjection of said composite unit to compression providing release of said processing liquid from said container and spreading of said liquid between outer surfaces of said exposed photosensitive sheet and said image-carrying sheet.

11. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm, a hook carried by said arm, means for swinging said arm into position adjacent said film unit holding means to permit said hook to engage a portion of said film unit, said swinging means being capable of swinging said hook and said engaged portion of said film to a position permitting exposure of said photosensitive area of said film unit, said hook being mounted for movement with respect to said arm, means for exposing said photosensitive area when said sheets are out of superposition, and means comprising a pair of pressure-applying surfaces mounted adjacent said discharge opening, said surfaces being adapted to compress said film unit during advancement of said unit between said surfaces, subjection of said composite unit to compression providing release of said processing liquid from said container and spreading of said liquid between facing surfaces of said exposed photosensitive sheet and said second sheet.

12. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm, an engaging means carried by said arm, means for swinging said arm into position adjacent said film unit holding means to permit said engaging means to engage a portion of said film unit, said swinging means being capable of swinging said engaging means and said engaged portion of said film unit to a position permitting exposure of said photosensitive area of said film unit, means for exposing said photosensitive area when said sheets are out of superposition, means comprising a pair of pressure-applying surfaces mounted adjacent said discharge opening, said surfaces being adapted to compress said film unit during advancement of said unit between said surfaces, subjection of said composite unit to compression providing release of said processing liquid from said container and spreading of said liquid between facing surfaces of said exposed photosensitive sheet and said second sheet, and means associated with said camera for indicating movement of said engaged portion into said position permitting exposure.

13. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm, a hook carried by said arm, means for swinging said arm into position adjacent said film unit holding means to permit said hook to engage a portion of said film unit, said swinging means being capable of swinging said hook and said engaged portion of said film unit to a position permitting exposure of said photosensitive area of said film unit, a slot in said arm for carrying said hook, means normally urging said hook in one direction along said slot, cam means for moving said hook in an opposite direction in said slot, means for exposing said photosensitive area when said sheets are out of superposition, and means comprising a pair of pressure-applying surfaces mounted adjacent said discharge opening, said surfaces being adapted to compress said film unit during advancement of said unit between said surfaces, subjection of said composite unit to compression providing release of said processing liquid from said container and spreading of said liquid between facing surfaces of said exposed photosensitive sheet and said second sheet.

14. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said second sheet superposed, means providing a discharge opening through which said two sheets of a unit may be discharged in superposition from said camera, an arm, a hook carried by said arm, means for swinging said arm into position adjacent said film unit holding means to permit said hook to engage a portion of said film unit, said swinging means being capable of swinging said hook and said engaged portion of said film unit to a position permitting exposure of said photosensitive area of said film unit, a slot in said arm for carrying said hook, means normally urging said hook in one direction along said slot, cam means for moving said hook in an opposite direction in said slot, said cam means being effective to cause said movement of said hook during only one direction of swinging of said arm, means for exposing said photosensitive area when said sheets are out of superposition, and means comprising a pair of pressure-applying surfaces mounted adjacent said discharge opening, said surfaces being adapted to compress said film unit during advancement of said unit between said surfaces, subjection of said composite unit to compression providing release of said processing liquid from said container and spreading of said liquid between facing surfaces of said exposed photosensitive sheet and said second sheet.

15. Camera apparatus for use with a composite film unit, said unit comprising a photosensitive sheet including a photosensitive layer carried by an opaque base, an image-carrying sheet superposed with an area of said photosensitive layer adapted to be exposed to light, a container carrying a processing liquid and positioned within said unit between the outer surfaces of said sheets adjacent an edge of said area, said photosensitive sheet being displaceable from superposition with the other sheet to permit exposure of said photosensitive area, said apparatus comprising, in combination, means for holding said image-carrying sheet stationary, means for engaging and moving a portion of said film unit so as to move said photosensitive sheet out of superposition with said held sheet and into said focal plane, means for exposing said photosensitive area when said photosensitive sheet is in said focal plane, means comprising a pair of pressure rolls mounted adjacent said holding means, means for holding said photosensitive sheet in said focal plane, and means operated by movement of said engaging means for releasing said photosensitive sheet from said last-named holding means to permit said photo-sensitive sheet to move, in superposition with the other sheet, between said pressure rolls, said pressure rolls being adapted to compress said film unit during advancement of said unit between said pressure rolls, progressive subjection of said composite unit to compression providing release of said processing liquid from said container and spreading of said liquid between outer surfaces of said exposed photosensitive sheet and said image-carrying sheet.

EDWIN H. LAND.

REFERENCES CITED

The following references are of record in the file of this patent:

UNITED STATES PATENTS

| Number | Name | Date |
|---|---|---|
| 2,447,468 | Reyniers | Aug. 17, 1948 |

Certificate of Correction

Patent No. 2,477,304

July 26, 1949

EDWIN H. LAND

It is hereby certified that errors appear in the printed specification of the above numbered patent requiring correction as follows:

Column 3, line 62, for "Film 20" read *Film unit 20*; column 8, line 27, for the word "tags" read *tabs*; line 42, for "swinwing" read *swinging*; column 12, line 39, for "photsensitive" read *photosensitive*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*